3,119,846
METHOD OF PREPARING EPOXY FATTY AMINES
Walter M. Budde, Jr., Minneapolis, Minn., assignor to Archer-Daniels-Midland Company, Minneapolis, Minn., a corporation of Delaware
No Drawing. Filed Feb. 29, 1960, Ser. No. 11,439
7 Claims. (Cl. 260—348)

This invention is a continuation-in-part and improvement upon my co-pending application Serial No. 693,275, filed October 30, 1957, now abandoned, and relating to an improvement or discovery in the preparation of epoxy fatty amines and polymers thereof. More particularly the invention relates to an improved method of reducing mono- and polyepoxy fatty nitriles and like corresponding aliphatic nitriles with retention of the oxirane group or groups when the nitrile is catalytically hydrogenated to form epoxy fatty amines under conditions of temperature and pressure.

The process hereinafter disclosed essentially distinguished in catalytically hydrogenating mono- and polyepoxy fatty and like aliphatic nitriles, under such conditions as would be expected to result in cleavage of the oxirane group or groups. However, contrary to expectations, there are formed mono- and polyepoxy primary amines and not hydroxy amines in the presence of $NH_3$. In the production of the described amines, the critical factor is the retention of the epoxy structure. The reactions involved are as follows:

(I)

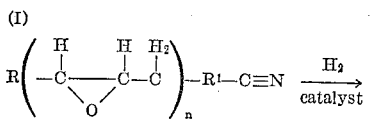
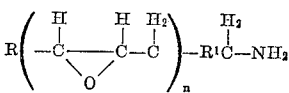

(II)

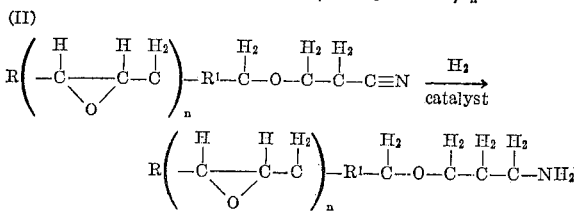

where R is an alkyl group of 1 to 10 carbon atoms inclusive, $R^1$ is an alkylene group of 1 to 10 carbon atoms inclusive, with the sum of the carbon atoms in R and $R^1$ between 8 and 20 inclusive and $n$ is an integer of 1 to 4 inclusive.

Epoxyamines have heretofore been prepared by dehydrohalogenation of amino-chlorohydrins, dehydration of dihydroxy amines or oxidation of unsaturated amines. Such methods are disclosed in U.S. Patents 2,712,544 and 2,712,545 and also J. Am. Chem. Soc. 77, 5412 (1955).

The epoxy nitriles shown in Reactions I and II are prepared by the epoxidation of unsaturated nitriles or ether propionitriles by conventional epoxidation procedures. The hydrogen peroxide-acetic acid technique catalyzed by polystyrene sulfonic acid, or in the presence of an ion exchange resin, the in situ sulfuric acid catalyzed method in the presence of acetic acid, the formic acid in situ process, and the preformed peracetic acid method are known to the art.

Prior to epoxidation the nitriles indicated in Reaction I are preferably derived from vegetable, animal and marine oils. Thus, the group

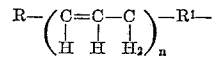

is characteristic of the structure in the mixed or single component fatty acid groups found in such non-limiting base oils having, for example, from 1 to 4 epoxidizable ethylenic groups as found in technical mixtures of tallow, lard, corn, cotton, soya ($n=2$), safflower, linseed ($n=3$), castor, menhaden, tall oil, sardine, sperm oils and like compounds. Single component base acids as erucic, oleic ($n=1$), linoleic ($n=2$), linolenic ($n=3$) and clupenodonic ($n=4$) and their homologues, polymers and isomers, provided that in the case of multiple unsaturation, the ethylenic groups are non-conjugated. Conventional procedures can be used to convert these fatty materials to nitriles. For example, as illustrated in Riener Patent No. 2,756,242, or otherwise by first connecting the unsaturated fatty material to a nitrile and then epoxidizing the fatty nitrile, as indicated.

The ether propionitriles of Reaction II, before epoxidation, are the alkali catalyzed addition products of fatty alcohols and acrylonitrile. The fatty alcohols used in this reaction are the hydrogenolysis products of the base fatty acids used for the nitriles of Reaction I. Thus, the structure of the fatty chain portions in both groups of compounds are identical. Again the alcohol radicals in the ether propionitriles can be either mixed or single components. The latter may be erucyl, oleyl, linoleyl, linolenyl and their homologues or isomers provided that in the case of multiple unsaturation the ethylenic groups are non-conjugated.

In the case of multiple non-conjugated unsaturation in the group

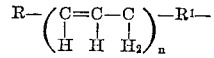

all or a part of the ethylenic groups may be converted to the oxirane structure. Thus, partially and fully epoxidized compounds are useful in the process of this invention.

Accordingly, it is an object of this invention to provide an improved method of preparing mono- and polyepoxy primary amines from mono- and polyepoxy nitriles in which the oxirane group or groups are retained while the nitrile group is reduced by catalytic hydrogenation.

It is a further object of this invention to provide an improved process for preparing mono- and polyepoxy amines from mono- and polyepoxy nitriles in which the oxirane group or groups are essentially retained while reducing a nitrile group of the epoxy nitrile under pressure and temperature conditions in the presence of a hydrogenation catalyst.

To the accomplishment of the foregoing and related ends, this invention or improvement then comprises the features herein and more fully described and particularly pointed out in the claims, the following description setting forth in detail certain illustrative embodiments hereof, these being relatively specific to the preferred ways and indicative of but a few of the various ways in which the principles of the improvement may be employed.

The hydrogenation of the mono- and/or polyepoxy nitriles of Reactions I and II is conducted in conventional hydrogenation equipment with hydrogenation catalysts in the presence or absence of ammonia at elevated temperatures and super atmospheric pressures. Solvents may or may not be used.

According to U.S. Patent 2,727,048 the oxirane group may be reduced to a hydroxyl group with hydrogen and palladium on charcoal in the presence of a liquid alkanoic acid, a liquid alkanoic acid anhydride, or mixtures of such acids and/or anhydrides to form a solution of low viscosity. For the purpose of this invention the reduction of the oxirane group is not desired. Accordingly, it has been found that Raney cobalt and Raney nickel or equivalent finely divided forms of these metals will essentially leave the oxirane groups unreduced. Unexpectedly, only between 5% and 10% of these are reduced by the preferred Raney type cobalt and nickel hydrogenation catalysts while the nitrile groups are essentially completely reduced.

The hydrogenation catalyst concentration at which the oxirane is not opened may range from 0.5% to 5%, or even at lower levels of about 0.05%, 0.1% and 0.25% with the preferred amount being about 2% by weight of the starting compound. While Raney nickel is the preferred catalyst, other nickel catalysts of this character as chrome-nickel catalyst, Raney cobalt and the like hydrogenation catalyst may be used.

The reduction temperature may range from room temperature up to about 130° C. with the preferred temperature about 96° C. to about 100° C. The time of reduction may be from two to about 12 hours and average time about 5½ to about 6 hours. The pressure may range from about 100 $NH_3$ p.s.i. to about 200 to on the order of 2000 p.s.i., total pressure, and the preferred pressure is about 500 to about 1200 p.s.i. Otherwise, the process may be modified utilizing only hydrogen pressure in the process to obtain predominately secondary amines.

The following are typical but non-limiting examples expressed in parts by weight and illustrate the process of this invention.

Example I

This example illustrates the preparation of a 9,10 epoxy stearyl amine.

Epoxystearylnitrile (300 parts) and Raney nickel (15 parts) were charged to a rocking type pressure vessel. The system was evacuated and ammonia was introduced to a pressure of 130 p.s.i. Then the pressure was brought to a total of 1200 p.s.i. with hydrogen, and maintained at this level throughout the process.

The temperature was gradually increased to 96° C. with agitation and held at the upper limit of 5½ hours. The reaction product was diluted with 150 ml. of toluene solvent, 4 parts of a conventional filter aid was added, and the mixture filtered. Solvent was removed by heating at 105° C. in a high vacuum for 20 minutes. The product solidified slightly below room temperature, and readily formed a carbonate. It had the following analysis:

Percent oxirane _____ 5.1
Percent primary amine nitrogen _____ 4.55

The starting epoxystearylnitrile contained 5.48% oxirane.

Example II

This example illustrates the preparation of a primary amine from epoxidized nitriles derived from soy bean oil.

Epoxidized nitriles derived from soy bean oil, containing 4.28% oxirane (500 parts) and Raney nickel (15 parts) were hydrogenated as in Example I. The total pressure was 1200 p.s.i. at 98° C. for 5½ hours. The product had the following analysis:

Percent oxirane _____ 4.0
Percent amine nitrogen _____ 4.38

Example III

This example illustrates the relationship of time, temperature and total pressure on the reduction of 9,10 epoxystearyl propionitrile ether.

Accordingly, 500 parts of 9,10 epoxystearyl propionitrile ether was reduced in the presence of 25 parts Raney nickel catalyst. The following table relates the physical conditions imposed on the system with formation of the amine composition.

| Time (hrs.) | Temp. (° C.) | Pressure (p.s.i.) | Percent Primary Amino N | | Percent Oxirane | |
|---|---|---|---|---|---|---|
| | | | Calc'd | Observed | Calc'd [1] | Observed |
| 2½ | 96 | 1,200 | ------ | 1.37 | ------ | 3.85 |
| 6 | 102 | 1,000 | 4.15 | 3.77 | 3.72 | 2.79 |
| 6½ | 98 | 1,200 | ------ | 3.92 | ------ | 3.49 |
| 7 | 96 | 750 | ------ | 2.32 | ------ | 3.92 |

[1] Based on oxirane content of starting nitrile.

Example IV

This example illustrates, by the procedure of Example III, the reduction to a primary amine of the propionitrile ether of linseed oil derived alcohols. This compound was incompletely epoxidized, and had the following constants:

Percent oxirane _____ 2.50
Percent nitrogen _____ 3.45
Iodine number _____ 20

Additional runs of the above examples, utilizing Raney cobalt and chrome-nickel catalyst in finely divided and particulate form, as the catalyst, produced substantially the same end results with very little variations in the final products. Accordingly, repetition of these additional examples are not set forth in detail.

Example V

[Equipment: 2 liter Parr autoclave, steam heat. Charge: 330 gms. epoxy stearyl nitrile, 0.825 methanol washed Raney nickel (0.25%)]

| Time | Temp., ° C. | Press., p.s.i.g. | Hours | Percent Total Am. N | Percent Sec. Am. N | Remarks |
|---|---|---|---|---|---|---|
| 07:29 | 65 | $NH_3$ 65 | ---- | ---- | ---- | Ammonia Charged. |
| 07:30 | 70 | [1] 200 | ---- | ---- | ---- | $H_2$ Charged. |
| 08:30 | 93 | 200 | 1.0 | 3.17 | 0.025 | |
| 10:30 | 93 | 200 | 3.0 | 3.58 | 0.050 | |
| 16:30 | 93 | 200 | 9.0 | 4.65 | 0.174 | |
| 16:50 | 93 | 200 | 9.3 | ---- | ---- | Cool down, vent. |

Final:
 4.76% total amine N
 0.25% sec. amine N
 I.V., 5.76
 Oxirane, 3.99%
Or:
 Primary amine, 91.2%
 Secondary amine, 9.8%
 Starting oxirane, 5.07%

Example VI

[Charge: 330 gms. epoxy stearyl nitrile, 0.33 gm. methanol washed Raney nickel (0.1%)]

| Time | Temp., ° C. | Press., p.s.i.g. | Hours | Percent Total Am. N | Percent Sec. Am. N | Remarks |
|---|---|---|---|---|---|---|
| 09:14 | 65 | $NH_3$ 130 | ---- | ---- | ---- | Charged ammonia. |
| 09:15 | 70 | [1] 400 | 0 | ---- | ---- | Start hydrogen. |
| 11:15 | 96 | 400 | 2 | ---- | ---- | |
| 12:30 | 105 | 400 | ---- | ---- | ---- | |
| 15:15 | 96 | 400 | 6 | 4.2 | 0.151 | |
| 17:15 | 90 | 400 | 8 | 4.2 | 0.151 | |
| 17:20 | 90 | 400 | ---- | ---- | ---- | Cool down, vent. |

Final:
 Total amine nitrogen, 4.27%
 Secondary amine nitrogen, 0.27%
 I.V., 4.79
 Oxirane, 4.81%
Or:
 Primary amine, 81%
 Secondary amine, 10.6%
 Starting oxirane, 5.07%

[1] In the above processes the initial ammonia pressure was brought to total by addition of hydrogen.

In general, the art will recognize that in the process disclosed, typical commercial or technical mixtures of the base material will contain predominately primary amines with possibly some secondary amines being present. In order to produce essentially the secondary amines, ammonia was eliminated from the above process and the illustrated reactions carried out under hydrogen pressure. To raise the production level of the secondary amine, it is preferred that the pressure be periodically vented to remove the ammonia gas formed in the reaction. This obtained a relatively higher yield of epoxy secondary amines having an approximate oxirane value of around 4%.

Uses for the above amines, as chemical intermediates, are illustrated by Payne Patent No. 2,712,545 disclosing how the above epoxy amines are utilized for the production of polycarboxylic amino acid chelating agents when the epoxy amine is produced by the different process shown therein. Otherwise the amines are useful as intermediates in forming epoxy complexes, as forming amides of epoxy amines see Payne et al. 2,730,531, as epoxy carrying agents, for producing epoxy tertiary and quaternary amines, and as additative components to resin systems to react therein and aid in curing.

The epoxy amines and derivatives thereof also serve as intermediates in the preparation of polyether polyamines and polyether polyamine derivatives. Such polyethers may be prepared in the manner described in my copending application Serial No. 624,725, filed November 28, 1956. In addition, the epoxy amines have been found to provide advantages when substituted in a similar way for the known amines in ore flotation. Further, the epoxy amines when added to oil-acid alkyd type resin coating vehicles even in small amounts of .05% reduce corrosion and further exhibit the properties attribtued to amine compounds when utilized in sufficient amounts. In addition, the "Epon" (bisphenol epichlorohydrin) resins are known to be plasticized by long chain fatty epoxy esters. The amines are also utilized as cross-linking agents for such "Epon" resins. The combined effect of the epoxy chain and the amine group is to obtain a reactant plasticizer that becomes a portion of the molecular structure of the "Epon" resin. In this respect superior coatings of "Epon" resins are obtained by utilizing the epoxy amines as corrosion inhibiting primer coatings and then applying a reactant "Epon" resin thereover to combine in a cross-linkage reaction, as known to the art.

Having described my invention and improvement in accordance with the patent statutes by the above examples and explanation of substitutes therein, it will be apparent that the specific embodiments are given by way of example and the invention or improvement is limited only by the terms of the appended claims.

I claim:

1. The process of preparing an epoxy fatty primary amine, which comprises the steps of hydrogenating an epoxy fatty nitrile with a fatty chain structure of the formula

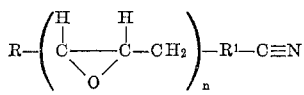

where R is an alkyl group of 1 to 10 carbon atoms, $R^1$ is an alkylene group of 1 to 10 carbon atoms and the sum of R and $R^1$ is between 8 and 20 carbon atoms inclusive, and $n$ is an integer of 1 to 4 inclusive, in the presence of hydrogenation catalyst effective in producing amines from nitriles and which does not substantially affect the oxirane value of the said epoxy nitrile, said steps including mixing a said nitrile material and from about .5% to about 5% said catalyst material, maintaining said nitrile and catalyst mixture under a combined ammonia and hydrogen pressure of about 500 to 2000 p.s.i., maintaining a reaction temperature of from about room temperature to about 130° C. for a period of from 2 to about 12 hours, and effecting the production of an epoxy fatty primary amine from said epoxy fatty nitrile.

2. The process of claim 1, wherein the temperature of reaction is maintained at about 96° C. to about 100° C. for a period of about 5½ hours to about 6 hours and the epoxy fatty group of the primary amine has no more than about a 10% reduction of the original oxirane content.

3. The process of claim 1, wherein the epoxidized fatty group,

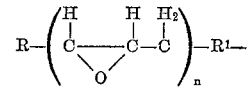

of the nitrile is derived from vegetable, animal and marine oils where R is an alkyl of 1 to 10 carbon atoms, $R^1$ is an alkylene of 1 to 10 carbon atoms with ths sum of R and $R^1$ not less than 8 carbon atoms, $n$ is an integer of 1 to 4, and the amine contains 12 to about 34 carbon atoms.

4. The process of claim 1 wherein, the hydrogenation catalyst is a catalyst selected from the group consisting of Raney nickel, Raney cobalt, and chrome-nickel.

5. The process of preparing an epoxy primary amine, which comprises the steps of hydrogenating an epoxy fatty nitrile having a fatty chain structure of the formula

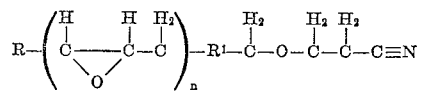

where R is an alkyl group of 1 to 10 carbon atoms, $R^1$ is an alkylene group of 1 to 10 carbon atoms and the sum of R and $R^1$ is between 8 and 20 carbon atoms inclusive, and $n$ is an integer of 1 to 4 inclusive, in the presence of hydrogenation catalyst effective in producing amines from nitriles and which does not substantially affect the oxirane value of the said epoxy nitrile, said steps including mixing a said nitrile material and from about .5% to about 5% said catalyst material, maintaining said nitrile and catalyst mixture under a combined ammonia and hydrogen pressure of about 500 to 2000 p.s.i., maintaining a reaction temperature of from about room temperature to about 130° C. for a period of from 2 to about 12 hours, and effecting the production of an epoxy fatty amine of said epoxy fatty nitrile.

6. The process of preparing an epoxy fatty amine, which comprises the steps of hydrogenating an epoxy fatty nitrile having a fatty chain structure of the formula

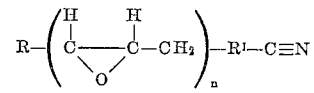

where R is an alkyl group of 1 to 10 carbon atoms, $R^1$ is an alkylene group of 1 to 10 carbon atoms and the sum of R and $R^1$ is from 8 through 20 carbon atoms, and $n$ is an integer of 1 through 4, in the presence of hydrogenation catalyst effective in producing amines from nitriles and which does not substantially affect the oxirane value of the said epoxy nitrile under elevated pressure and temperature conditions, the steps comprising mixing a said nitrile material and from about 0.05% to about 5% said catalyst material, placing said mixture under hydrogen pressure of about 100 to 2000 p.s.i., maintaining a reaction temperature from about normal room temperature to about 130° C. for a period of from about 2 to about 12 hours, and effecting the production of an epoxy fatty amine of said epoxy fatty nitrile.

7. The process of claim 6 including the step of placing said mixture under a combined ammonia and hydrogen pressure of about 200 to about 2000 p.s.i. and effecting the production of essentially a primary amine.

References Cited in the file of this patent

UNITED STATES PATENTS

| | | |
|---|---|---|
| 2,561,984 | Hillyer et al. | July 24, 1951 |
| 2,712,544 | Bersworth | July 5, 1955 |
| 2,712,545 | Bersworth | July 5, 1955 |
| 2,730,531 | Payne et al. | Jan. 10, 1956 |
| 2,756,242 | Riener | July 24, 1956 |
| 2,769,798 | Meis et al. | Nov. 6, 1956 |
| 2,856,370 | Muetterties | Oct. 14, 1958 |

OTHER REFERENCES

Degering: An Outline of Organic Nitrogen Compounds, pp. 203–204 (1945).

Steck et al.: J.A.C.S., vol. 70, pp. 4063–4064 (1948).

Fuson: Advanced Organic Chemistry, pages 253 to 257, J. Wiley, 1950.

Chem. Abs., volume 49 (1949), Subject Index A–I, page 10437.

Bergmann: J. Applied Chem. (London), vol. 1 (1951), pp. 380–2.

Chem. Abs., volume 53, December 1959, Subject Index A–I, page 1032s.